(12) United States Patent
Tamarapoo et al.

(10) Patent No.: US 9,399,385 B2
(45) Date of Patent: Jul. 26, 2016

(54) REAR WINDOW ASSEMBLY

(71) Applicant: HONDA MOTOR CO., LTD., Tokyo (JP)

(72) Inventors: Bob Tamarapoo, Powell, OH (US); Brock Jared Stull, Columbus, OH (US); Michael Binfet, Bellefontaine, OH (US); Michael N. Peterson, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/567,491

(22) Filed: Dec. 11, 2014

(65) Prior Publication Data

US 2016/0167487 A1    Jun. 16, 2016

(51) Int. Cl.
*B60J 1/18* (2006.01)
*B60J 1/00* (2006.01)

(52) U.S. Cl.
CPC .............. *B60J 1/1853* (2013.01); *B60J 1/007* (2013.01)

(58) Field of Classification Search
CPC .......... B60J 1/1853; B60J 1/007; B60J 1/006; B60J 1/008
USPC ................... 296/146.16, 190.1, 201, 30, 154, 296/146.15, 96.21
See application file for complete search history.

(56) References Cited

U.S. PATENT DOCUMENTS

| | | | |
|---|---|---|---|
| 4,785,583 A * | 11/1988 | Kawagoe | B60J 10/04 49/404 |
| 4,845,890 A | 7/1989 | Terada et al. | |
| 5,522,191 A * | 6/1996 | Wenner | B60J 1/16 296/146.1 |
| 6,691,464 B2 | 2/2004 | Nestell et al. | |
| 6,902,224 B2 | 6/2005 | Weinert et al. | |
| 7,025,405 B2 | 4/2006 | Gillen | |
| 7,073,293 B2 | 7/2006 | Galer | |
| 7,963,070 B2 | 6/2011 | Recker | |
| 8,250,812 B2 | 8/2012 | Hebert et al. | |
| 8,328,273 B2 * | 12/2012 | Baroggi | B60J 1/02 296/146.15 |
| 2003/0137161 A1 * | 7/2003 | Gillen | B60J 1/1853 296/146.16 |
| 2005/0073172 A1 * | 4/2005 | Weinert | B60J 1/1853 296/146.16 |
| 2006/0107600 A1 * | 5/2006 | Nestell | E05D 15/0621 49/413 |
| 2008/0122262 A1 * | 5/2008 | Cicala | B60J 1/1853 296/201 |
| 2010/0154312 A1 | 6/2010 | Gipson et al. | |
| 2012/0137593 A1 | 6/2012 | Cicala | |
| 2013/0174488 A1 | 7/2013 | Snider et al. | |
| 2013/0255156 A1 | 10/2013 | Snider | |

* cited by examiner

*Primary Examiner* — Jason S Morrow
*Assistant Examiner* — E Turner Hicks
(74) *Attorney, Agent, or Firm* — Armstrong Teasdale LLP (57) ABSTRACT

A rear window assembly includes a glass flange positioned in a window opening. The glass flange includes a body mounting flange mounted to a body of a vehicle. The glass flange has a first mounting pad defining a first mounting area for a window for mounting a first glass variation to the vehicle. The glass flange has a second mounting pad defining a second mounting area for a window for mounting a second glass variation to the vehicle. The second mounting pad is recessed toward an interior of the vehicle. The second glass variation has a slider rail and a slider glass, while the first glass variation is devoid of a slider rail and slider glass. The glass flange selectively receives either the first glass variation or the second glass variation in the window opening.

20 Claims, 4 Drawing Sheets

REAR WINDOW ASSEMBLY

BACKGROUND

The present disclosure relates generally to rear window assemblies for vehicles.

During manufacture and assembly of a vehicle, glass windows are assembled in corresponding window openings in the body. The body has a glass flange around the opening that the glass is attached to. The flange is shaped to receive the glass and the glass is applied to the flange using urethane or other adhesives. However, with some vehicles, different glass variations are desired for different models or trims. For example, some manufacturers offer trucks that include a rear window that is a single, fixed pane of glass or, as an option, include a rear window with multiple panes of glass allowing the rear window to open and close. For example, one pane may slide with respect to the other panes. The rear window with the slider may include rails and other components that the window without the slider does not include.

Conventional vehicles may use different glass flanges to accommodate the different windows. For example, conventional vehicles use a first flange to accommodate a window without a slider and use a second, different flange to accommodate a window with a slider. Alternatively, some other conventional vehicles may also apply a frame to the fixed glass to equal the thickness of the slider glass rails. Assembly requires tracking which vehicles need the first flange and which vehicles need the second flange. Attachment of the flanges may require different processes, which leads to a more complex manufacturing process.

BRIEF DESCRIPTION

In one embodiment, a rear window assembly for a vehicle is provided that includes a glass flange configured to be positioned in a window opening of a body of the vehicle. The glass flange includes a body mounting flange configured to be mounted to the body of the vehicle. The glass flange has a first mounting pad near an outer end of the glass flange facing an exterior of the vehicle. The first mounting pad defines a first mounting area for a window configured to mount a first glass variation to the vehicle. The glass flange has a second mounting pad near an inner end of the glass flange facing an exterior of the vehicle. The second mounting pad defines a second mounting area for a window configured to mount a second glass variation to the vehicle. The second mounting pad is recessed toward an interior of the vehicle relative to the first mounting pad. The second glass variation has a slider rail and a slider glass, while the first glass variation is devoid of a slider rail and slider glass. The glass flange selectively receives either the first glass variation or the second glass variation in the window opening.

In another embodiment, a rear window assembly for a vehicle is provided that includes a glass flange configured to be positioned in a window opening of a body of the vehicle. The glass flange has an outer end and an inner end opposite the outer end. The glass flange has an exterior surface facing an exterior of the vehicle and an interior surface facing an interior of the vehicle. The glass flange includes a body mounting flange proximate to the outer end configured to be mounted to the body of the vehicle. The glass flange includes a first mounting pad defined along the exterior surface proximate to the outer end. The glass flange includes a second mounting pad defined along the exterior surface proximate to the inner end. The second mounting pad is recessed toward the interior of the vehicle relative to the first mounting pad. The rear window assembly includes a non-slider window having a fixed glass having an edge and a seal directly applied to the fixed glass of the non-slider window proximate to the edge. The rear window assembly has a slider window having a fixed glass having an edge, a slider rail applied directly to the fixed glass of the slider window proximate to the edge, a slider window received in the slider rail and movable relative to the fixed glass of the slider window, and a seal directly applied to the slider rail. The glass flange selectively receives the non-slider window or the slider window. When the non-slider window is mounted to the glass flange, the seal of the non-slider window is affixed to the first mounting pad. When the slider window is mounted to the glass flange, the seal of the slider window is affixed to the second mounting pad with the slider rail positioned between the second mounting pad and the fixed glass of the slider window.

In a further embodiment, a method of assembling a vehicle is provided that includes providing a body with a window opening and attaching a glass flange to the body around the window opening. The glass flange has a first mounting pad and a second mounting pad offset from the first mounting pad and recessed toward an interior of the vehicle relative to the first mounting pad to define a pocket rearward of the second mounting pad. The method includes selectively attaching either a non-slider window to the first mounting pad or a slider window to the second mounting pad, where a slider rail of the slider window is received in the pocket rearward of the second mounting pad when the slider window is mounted to the glass flange.

DETAILED DESCRIPTION

Various embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of methods and systems for mounting window assemblies into a window opening of a body of a vehicle are provided. It should be noted that although the various embodiments are described in connection with rear window assemblies, one or more embodiments may be implemented in different applications, such as for mounting into different openings in a vehicle. Additionally, while various embodiments are described in connection with mounting window assemblies in automotive vehicles, such as trucks, one or more embodiments may be implemented in different types of vehicles. Furthermore, while various embodiments are describe in connection with mounting either fixed window assemblies or slider window assemblies, one or more embodiments may be implemented in mounting other types of window assemblies, such as powered window assemblies that are raised and lowered.

Figure 1:
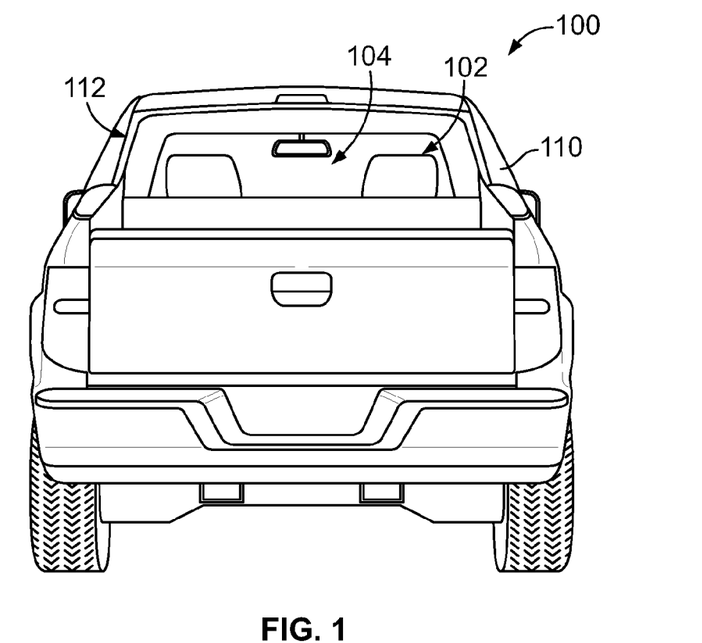
FIG. 1 is a rear view of a vehicle having a fixed rear window assembly formed in accordance with an exemplary embodiment.
Figure 2:
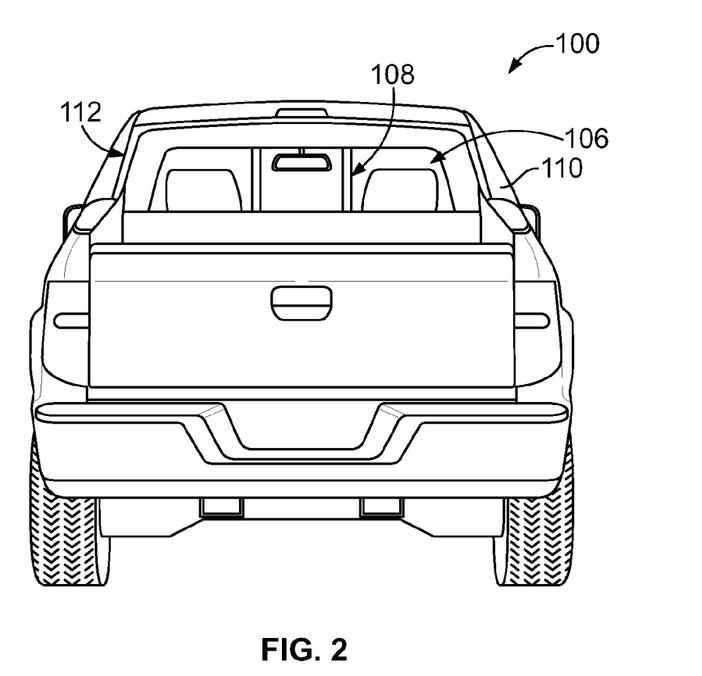
FIG. 2 is a rear view of the vehicle showing a sliding rear window assembly formed in accordance with an exemplary embodiment.

FIG. 1 is a rear view of a vehicle 100 having a rear window assembly 102 formed in accordance with an exemplary embodiment. The rear window assembly 102 has a first glass variation, which may be referred to as a fixed glass variation. FIG. 2 is a rear view of the vehicle 100 showing a different rear window assembly 106. The second rear window assembly 106 has a second glass variation 108, which may be referred to as a slider glass variation. The rear window assemblies 102, 106 are shown at the rear of a cab of the vehicle 100 in the illustrated embodiments. Other types of window assemblies in other locations of the vehicle 100 may be provided in alternative embodiments. The rear window assemblies 102, 106 may be provided on other types of vehicles in alternative embodiments. Other types of glass variations may be mounted to the vehicle 100 in alternative embodiments.

The vehicle 100 includes a body 110 that defines a window opening 112. The window opening 112 is configured to receive either the first rear window assembly 102 or the second rear window assembly 106, depending on the type of glass variation desired. In an exemplary embodiment, the vehicle 100 includes a glass flange 114 (shown in FIGS. 5-10). The glass flange 114 may be made up of multiple body flanges around the window opening 112. The glass flange 114 is configured to receive the first rear window assembly 102 and is configured to receive the second rear window assembly 106. The glass flange 114 receives the rear window assemblies 102, 106 without modification to the glass flange 114. As such, the same part or structure is able to receive the various glass variations 104, 108. For example, during vehicle assembly or manufacture, the glass flange 114 is attached to the body 110 and then an assembly line worker or assembly line robot is able to selectively attach either rear window assembly 102, 106 into the window opening 112, as either glass variation 104, 108 is able to be attached to the same glass flange. Assembly and manufacture of the vehicle 100 is easier using the same glass flange 114 to accept the rear window assembly 102 or the rear window assembly 106. It is not necessary during manufacture or assembly to pre-select which type of rear window assembly is to be installed and then pre-install an appropriate glass flange that is able to accept only the particular (single) type of rear window assembly. Cost is reduced and efficiency is increased by the use of the multi-purpose glass flange 114.

Figure 3:
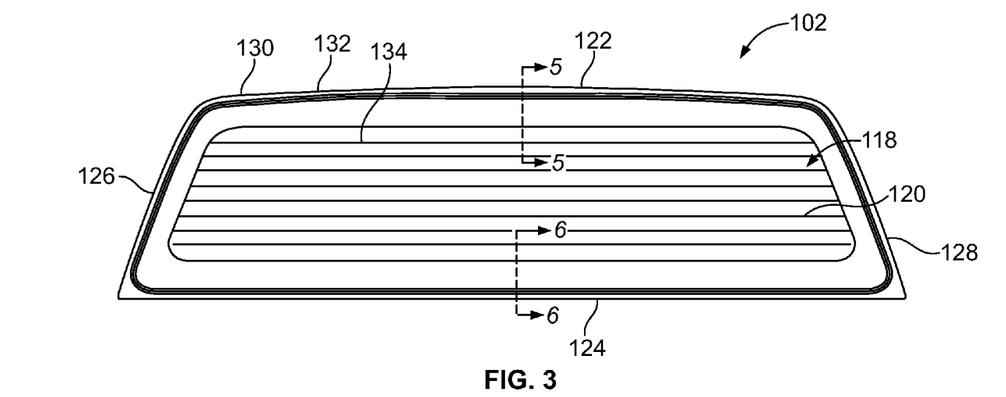
FIG. 3 illustrates the fixed glass variation rear window assembly that may be mounted in a window opening to a glass flange formed in accordance with an exemplary embodiment.
Figure 5:
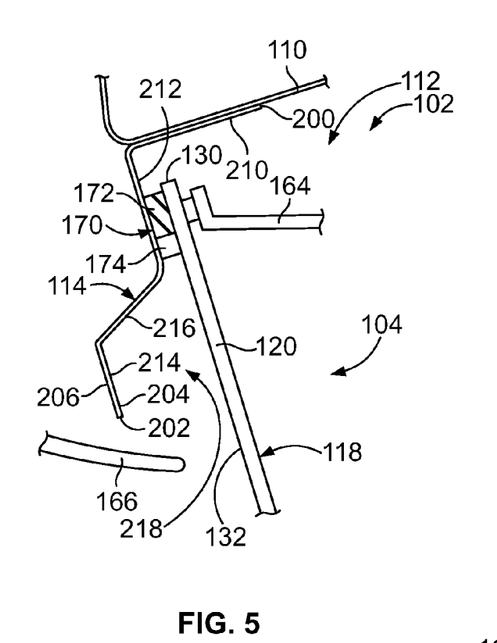
FIG. 5 is a cross sectional view of a portion of the fixed glass variation rear window assembly mounted in the vehicle taken along line 5-5, which is illustrated in FIG. 3.

FIG. 3 illustrates the rear window assembly 102 (fixed glass variation) that may be mounted in the window opening 112 to the glass flange 114 (shown in FIG. 5). The rear window assembly 102 includes a non-slider window 118 that includes a fixed glass 120. The fixed glass 120 is a single or solid piece of glass that extends between a top 122, a bottom 124, and opposite sides 126, 128 of the rear window assembly 102. The fixed glass 120 has a continuous edge 130 that extends around an outer perimeter of the fixed glass 120. The edge 130 defines a top edge at the top 122, a bottom edge at the bottom 124 and side edges at the sides 126, 128. The fixed glass 120 has an interior surface 132 and an exterior surface 134.

Figure 4:
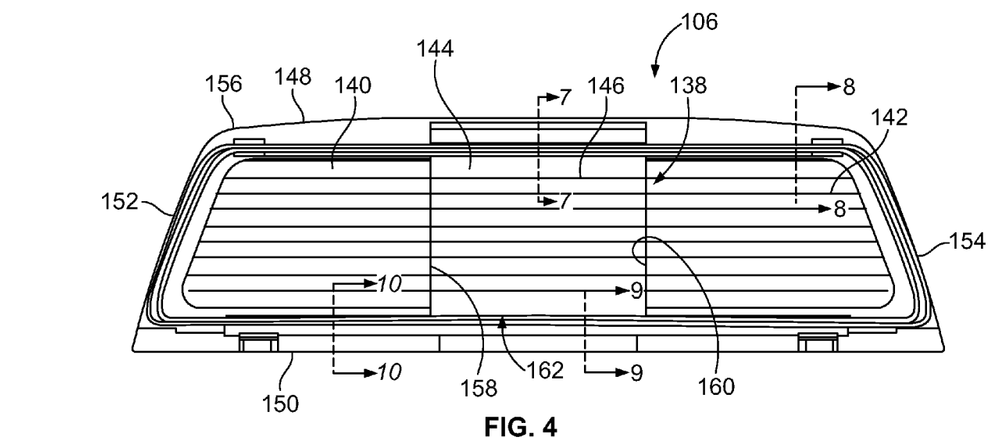
FIG. 4 illustrates the slider glass variation rear window assembly that may be mounted in the window opening to the glass flange.
Figure 7:
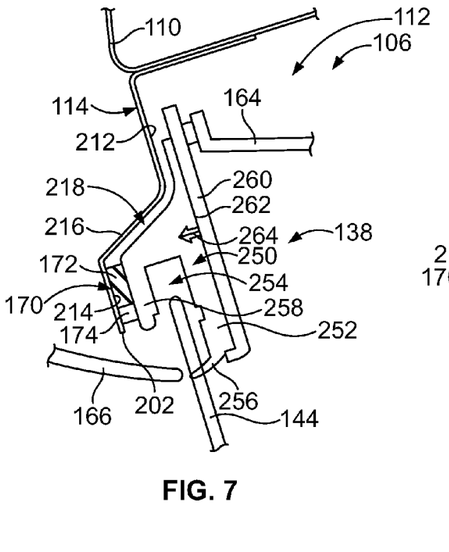
FIG. 7 is a cross sectional view of an upper portion of the slider glass variation rear window assembly mounted in the vehicle taken along line 7-7, which is illustrated in FIG. 4.

FIG. 4 illustrates the rear window assembly 106 (slider glass variation) that may be mounted in the window opening 112 to the glass flange 114 (shown in FIG. 7). The rear window assembly 106 includes a slider window 138, having at least one fixed glass and at least one slider glass movable relative to the fixed glass to open or close the rear window assembly 106. In the illustrated embodiment, the slider window 138 of the rear window assembly 106 includes a first fixed glass 140, a second fixed glass 142, a first slider glass 144 and a second slider glass 146. The first and second slider glasses 144, 146 may be independently movable relative to each other and relative to the corresponding fixed glasses 140, 142.

The first fixed glass 140 extends between a top 148 and a bottom 150 of the rear window assembly 106 and is provided at a first side 152 of the rear window assembly 106. The second fixed glass 142 extends between the top 148 and the bottom 150, and is provided at a second side 154 of the rear window assembly 106. The glasses 140, 142, 144, 146 have outer edges 156 surrounding perimeters thereof. The first fixed glass 140 extends from the first side 152 to an inner edge 158. The second fixed glass 142 extends from the second side 154 to an inner edge 160. An opening 162 is defined between the inner edges 158, 160. The slider glasses 144, 146 are provided in the opening 162 to open or close the opening 162. Either or both of the slider glasses 144, 146 may be opened by sliding the slider glass(es) 144, 146 relative to the fixed glass (es) 140, 142. Optionally, the slider glasses 144, 146 may be provided interior of the corresponding fixed glass 140, 142. Alternatively, the slider glass 144, 146 may be provided exterior of the corresponding fixed glass 140, 142.

Figure 6:
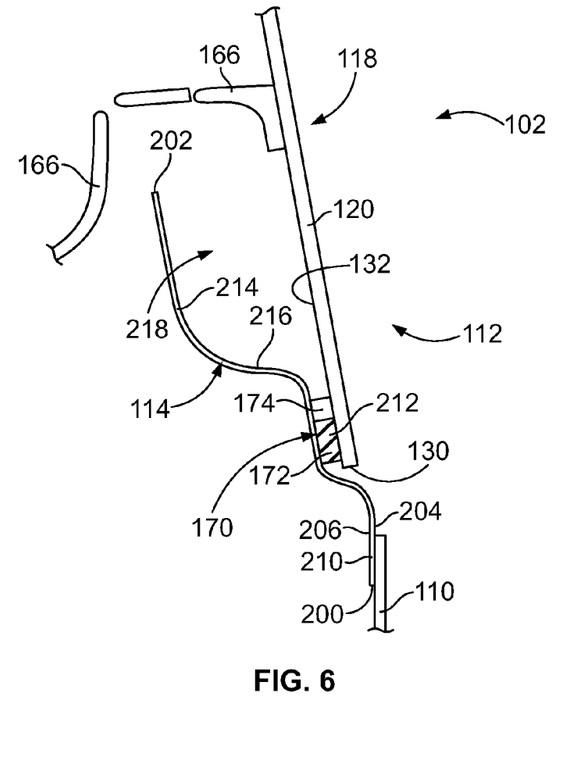
FIG. 6 is a cross sectional view of a portion of the rear window assembly taken along line 6-6, which is shown in FIG. 3.

FIG. 5 is a cross sectional view of a portion of the first rear window assembly 102 (fixed glass variation) mounted in the vehicle 100 (showing in FIG. 1) taken along line 5-5, which is illustrated in FIG. 3. FIG. 6 is a cross sectional view of a portion of the first rear window assembly 102 formed in accordance with an exemplary embodiment taken along line 6-6, which is shown in FIG. 3. FIG. 5 shows an upper portion of the rear window assembly 102, while FIG. 6 shows a lower portion of the rear window assembly 102.

The rear window assembly 102 utilizes the fixed glass variation 104, which includes the fixed glass 120. The fixed glass 120 is positioned within the window opening 112 of the body 110. The fixed glass 120 is secured in position within the window opening 112 using the glass flange 114. The glass flange 114 illustrated in FIG. 5 defines an upper glass flange, which may be referred to hereinafter as upper glass flange 114. The glass flange 114 illustrated in FIG. 6 defines a lower glass flange, which may be referred to hereinafter as a lower glass flange 114. In an exemplary embodiment, the upper and lower glass flanges 114 are separate components that are separately mounted to upper and lower portions of the body 110; however, a continuous structure defining the glass flange 114 may be received in the window opening 112 and attached to the body 110 in alternative embodiments, such as a structure also extending along the sides of the window opening 112.

In the illustrated embodiment, a spoiler 164 extends rearward from the exterior of the fixed glass 120. The spoiler 164 may tie into the body 110 or otherwise form a portion of an exterior of the vehicle 100. The spoiler 164 may house other components, such as a rear taillight (not shown). The rear window assembly 106 may be provided without the spoiler 164 in alternative embodiments. Optionally, an outer seal (not shown) may be provided at the top, bottom and/or sides of the rear window assembly 106, which may visually hide portions of the glass flange 114, body 110 and/or the rear window assembly 106.

In the illustrated embodiment, pieces of interior trim 166 are shown extending into proximity of the non-slider window 118. The trim 166 may cover the glass flange 114 to hide the glass flange 114 from view from inside the vehicle 100. Optionally, the trim 166 may seal against the fixed glass 120.

In an exemplary embodiment, a seal 170 is provided between the fixed glass 120 and the glass flange 114. The seal 170 is used to mechanically secure the fixed glass 120 to the glass flange 114. The seal 170 provides a mechanical seal or barrier to prevent leakage into the cab of the vehicle 100, contain pressure within the cab of the vehicle 100 and/or exclude environmental transfer between the interior and the exterior of the vehicle 100. The seal 170 extends entirely circumferentially around the edge 130 of the fixed glass 120 to provide a continuous seal for the rear window assembly 102.

In an exemplary embodiment the seal 170 includes a urethane member 172 and a rubber dam 174. The urethane member 172 conforms to the glass flange 114 and the interior surface 132 of the fixed glass 120 to adhere the fixed glass 120 to the glass flange 114. The rubber dam 174 is a spacer to position the fixed glass 120 a predetermined distance from the glass flange 114. The rubber dam 174 may block or contains the urethane member 172 and prevents seepage of the urethane member 172 into the interior of the vehicle. For example, along the upper portion (FIG. 5), the rubber dam 174 is positioned below the urethane member 172, whereas along the lower portion (FIG. 6), the rubber dam 174 is positioned above the urethane member 172. The urethane member 172 may be applied in a viscous state and may provide a strong mechanical bond once the urethane member 172 sets. Other types of sealants or adhesives may be used in alternative embodiments to secure the fixed glass 120 to the glass flange 114.

In an exemplary embodiment, the glass flange 114 is manufactured from a metal material, such as a piece of sheet metal, which is stamped and formed into a predetermined shape. The glass flange 114 may be manufactured from other materials in alternative embodiments. The glass flange 114 has an outer end 200 and an inner end 202 opposite the outer end 200. The outer end 200 is configured to be mounted to the body 110. For example, the glass flange 114 may be secured to the body 110 by any appropriate means, for example, but not limited to, welding. The inner end 202 may be cantilevered from the body 110. The glass flange 114 has an exterior surface 204 facing an exterior of the vehicle 100 and an interior surface 206 facing an interior of the vehicle 100.

The glass flange 114 includes a body mounting flange 210 proximate to the outer end 200 that is configured to be mounted to the body 110 of the vehicle 100. For example, the body mounting flange 210 may be welded to the body 110. Optionally, the body mounting flange 210 may rest flush against the body 110. The body mounting flange 210 may be provided at, and define, the outer end 200 of the glass flange 114. The body mounting flange 210 may be bent or angled outward for attachment of the interior surface 206 to the body 110, as in the illustrated embodiment. Alternatively, the body mounting flange 210 may be bent or angled inward for attachment of the exterior surface 204 to the body 110.

The glass flange 114 includes multiple mounting pads for mounting rear window assemblies in various mounting locations on the glass flange 114. In an exemplary embodiment, the glass flange 114 includes a first mounting pad 212 and a second mounting pad 214 remote from the first mounting pad 212. More than two mounting pads may be provided in alternative embodiments.

The first mounting pad 212 is defined along the exterior surface 204 proximate to the outer end 200 and/or the body mounting flange 210. The second mounting pad 214 is defined along the exterior surface 204, and may be positioned proximate to the inner end 202. In an exemplary embodiment, the second mounting pad 214 is recessed towards the interior of the vehicle relative to the first mounting pad 212. For example, a transition wall 216 is provided between the first mounting pad 212 and the second mounting pad 214 to transition the second mounting pad 214 inward toward the interior of the vehicle 100.

The glass flange 114 defines a pocket 218 between the first mounting pad 212 and the second mounting pad 214. The pocket 218 is configured to receive portions of window assemblies, when present. For example, with reference to FIG. 7, the pocket 218 may receive a slider rail 250 of the rear window assembly 106.

In an exemplary embodiment, the first mounting pad 212 is generally planer. The second mounting pad 214 is generally planer. The second mounting pad 214 may be parallel to and non-coplanar with the first mounting pad 212. For example, the second mounting pad 214 may be offset with respect to the plane of the first mounting pad 212 by the transition wall 216. The transition wall 216 is oriented transverse to the first mounting pad 212 and the second mounting pad 214. For example, the transition wall 216 may extend approximately perpendicular to the first mounting pad 212 and the second mounting pad 214; however the transition wall 216 may be oriented at any angle relative to the first and second mounting pads 212, 214.

Optionally, the glass flange 114 may be bent at sharp angles at the transitions or corners between the first mounting pad 212 and the transition wall 216 and/or between the second mounting pad 214 and the transition wall 216. Alternatively, the transition wall 216 may include rounded corners at the transitions to the first and second mounting pads 212, 214.

The size, shape and/or orientation of the transition wall 216 may depend on the desired size and shape of the pocket 218. For example, the transition wall 216 may be sized, shaped and/or oriented to receive the slider rail 250 of the rear window assembly 106. In an exemplary embodiment, the first and second mounting pads 212, 214 may be oriented generally parallel to the interior surface 132 of the fixed glass 120. The transition wall 216 transitions away from the interior surface 132 of the fixed glass 120 to form the pocket 218.

Figure 8:
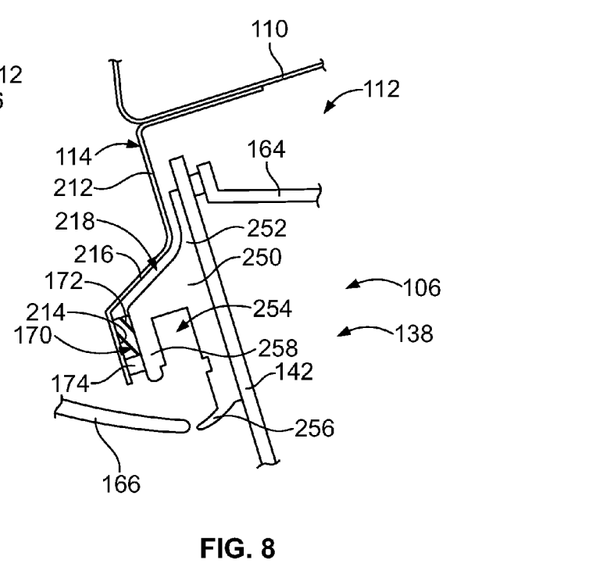
FIG. 8 is a cross sectional view of an upper portion of the slider glass variation of the rear window assembly taken along line 8-8, which is shown in FIG. 4.
Figure 9:
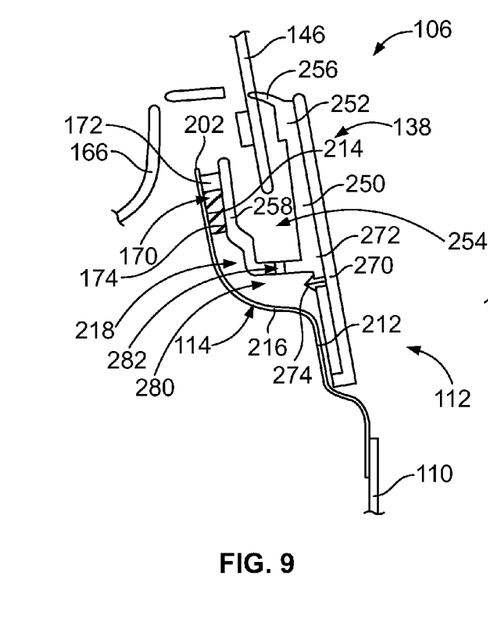
FIG. 9 is a cross sectional view of a lower portion of the slider glass variation of the rear window assembly taken along line 9-9, which is shown in FIG. 4.
Figure 10:
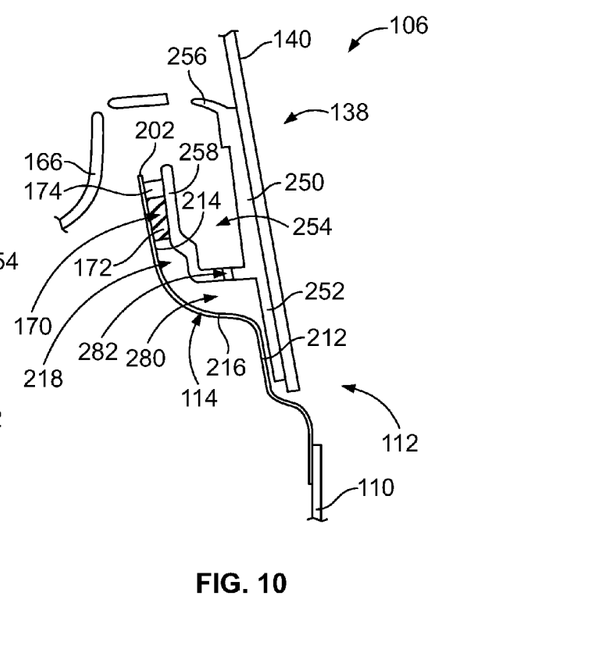
FIG. 10 is a cross sectional view of a lower portion of the slider glass variation of the rear window assembly taken along line 10-10, which is shown in FIG. 4.

FIG. 7 is a cross sectional view of an upper portion of the second rear window assembly 106 (slider glass variation) mounted in the vehicle 100 (shown in FIG. 1) taken along line 7-7, which is illustrated in FIG. 4. FIG. 8 is a cross sectional view of an upper portion of the second rear window assembly 106 formed in accordance with an exemplary embodiment taken along line 8-8, which is shown in FIG. 4. FIG. 9 is a cross sectional view of a lower portion of the second rear window assembly 106 formed in accordance with an exemplary embodiment taken along line 9-9, which is shown in FIG. 4. FIG. 10 is a cross sectional view of a lower portion of the second rear window assembly 106 formed in accordance with an exemplary embodiment taken along line 10-10, which is shown in FIG. 4.

The rear window assembly 102 utilizes the slider window 138, which includes the fixed glass 140 (FIG. 10), the fixed glass 142 (FIG. 8), the slider glass 144 (FIG. 7) and the slider glass 146 (FIG. 9). The slider window 138 is positioned within the window opening 112 of the body 110. The slider window 138 is secured in position within the window opening 112 using the glass flange 114. The glass flange 114 is the same glass flange 114 shown in FIGS. 5-6, and, in addition to being able to secure the fixed window 118 (shown in FIGS. 5-6) in the window opening 112, is also able to secure the slider window 138 in the window opening 112. The glass flange 114 illustrated in FIGS. 7 and 8 defines an upper glass flange, while the glass flange 114 illustrated in FIGS. 9 and 10 defines a lower glass flange. The spoiler 164 (FIGS. 7 and 8) extends rearward from the exterior of the slider window 138.

The rear window assembly 106 includes a slider rail 250 that receives the slider glasses 144, 146. The slider rail 250 includes a base 252 that may be secured to the fixed glasses 140, 142. The slider rail 250 includes a channel 254 that receives an edge of the slider glasses 144, 146. The slider glasses 144, 146 slide within the channel 254. The slider rail 250 includes a lip seal 256 that may be sealed against the slider glasses 144, 146. The lip seal 256 may be deflectable.

The slider rail 250 includes a mounting bracket 258 used for mounting the slider rail 250 to the glass flange 114. In an exemplary embodiment, the seal 170 is provided between the mounting bracket 258 and the glass flange 114 to mechanically attach the slider rail 250 to the glass flange 114. When the rear window assembly 106 is positioned within the window opening 112, the slider rail 250 is received in the pocket 218. The slider rail 250 is attached to the second mounting pad 214 of the glass flange 114. For example, the seal 170 is mechanically fixed between the mounting bracket 258 of the slider rail 250 and the second mounting pad 214. The rubber dam 174 positions the slider rail 250 within the pocket 218 and the urethane 172 is sealed to the glass flange 114 and to the slider rail 250. The seal 170 is used to mechanically secure the slider rail 250 to the glass flange 114. The seal 170 provides a mechanical seal or barrier to prevent leakage into the cab of the vehicle 100, contain pressure within the cab of the vehicle 100 and/or exclude environmental transfer between the interior and the exterior of the vehicle 100.

In the illustrated embodiment, pieces of interior trim 166 are shown extending into proximity of the slider window 138. The trim 166 may cover the glass flange 114 to hide the glass flange 114 from view from inside the vehicle 100. Optionally, the trim 166 may seal against the glasses 140, 142, 144, 146.

FIG. 7 illustrates the slider rail 250 as an upper slider rail 250 along an upper portion of the rear window assembly 106. The glass flange 114 generally follows the contours of the slider rail 250 and does not interfere with the positioning of the slider rail 250 within the pocket 218. For example, the rubber dam 174 positions the slider rail 250 in a spaced apart position with respect to the glass flange 114.

In an exemplary embodiment, an upper applique 260 is attached to an exterior 262 of the slider rail 250, such as along the base 252. A clip 264 is used to attach the upper applique 260 to the base 252; however other securing means may be used in alternative embodiments. Optionally, the spoiler 164 may be directly attached to the upper applique 260 and/or the slider rail 250.

FIG. 8 shows an upper portion of the rear window assembly 102 taken through the fixed glass 142. The upper slider rail 250 is secured directly to the interior of the fixed glass 142. For example, an adhesive, such as a urethane member, may be used to secure the slider rail 250 to the fixed glass 142. The slider rail 250 is secured to the glass flange 114 to hold the fixed glass 142 relative to the glass flange 114.

FIG. 9 shows a lower portion of the rear window assembly 106 showing the lower slider rail 250 secured to the lower glass flange 114. A lower applique 270 is attached to the slider rail 250, such as along an exterior 272 of the base 252 of the slider rail 250. Optionally, a clip 274 may be used to secure the lower applique 270 to the mounting bracket 258; however other securing means may be used in alternative embodiments.

The slider rail 250 is positioned above the transition wall 216 within the pocket 218, which forms a well 280 between the slider rail 250 and the glass flange 114. The seal 170 is positioned at an upper end of the well 280, such as proximate to the inner end 202 of the glass flange 114. The well 280 may be used to divert any moisture or water that accumulates in the slider rail 250 and/or between the slider rail 250 and the glass flange 114. For example, the slider rail 250 may include holes 282 that allow water to escape from the channel 254 into the well 280. Any water that accumulates in the well 280 is able to flow down the glass flange 114 between the slider rail 250 and the glass flange 114 to flow out of the well 280. For example, a space may be formed between the first mounting pad 212 and the slider rail 250 to allow the water to escape and drain. The seal 170 is provided at the top of the well 280 to prevent the water from flowing into the interior of the vehicle 100. Optionally, an outer seal (not shown) may be provided at the top, bottom and/or sides of the rear window assembly 106, which may visually hide portions of the glass flange 114, body 110 and/or the rear window assembly 106.

FIG. 10 illustrates a lower portion of the rear window assembly 106 taken through the fixed glass 140. The lower slider rail 250 is secured directly to the interior of the fixed glass 140. For example, an adhesive, such as a urethane member, may be used to secure the slider rail 250 to the fixed glass 140. The slider rail 250 is secured to the glass flange 114 to hold the fixed glass 140 relative to the glass flange 114.

Various embodiments describe herein provide a dual glass flange that is capable of attaching a non-slider window (e.g., a window without a slider) to the body of the vehicle in the window opening and capable of attaching a slider window (e.g., a window with a slider) to the body in the window opening. The dual glass flange includes a first mounting pad and a second mounting pad recessed with respect to the first mounting pad to accommodate the rail and other components needed for the slider. The first mounting pad is used for certain types of windows without using the second mounting pad and the second mounting pad is used for other types of windows without using the first mounting pad.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A rear window assembly for a vehicle comprising:
   a glass flange configured to be positioned in a window opening of a body of the vehicle, the glass flange having an outer end, an inner end opposite the outer end, and an exterior surface facing an exterior of the vehicle, the glass flange comprising a body mounting flange proximate to the outer end and configured to be mounted to the body of the vehicle;
   the glass flange having a first mounting pad defined along the exterior surface near the outer end of the glass flange, the first mounting pad defining a first mounting area for a window configured to mount a first glass variation to the vehicle;
   the glass flange having a second mounting pad defined along the exterior surface near the inner end of the glass flange, the second mounting pad defining a second mounting area for a window configured to mount a second glass variation to the vehicle, the second mounting pad being recessed toward an interior of the vehicle relative to the first mounting pad, the second glass variation having a fixed glass, a slider rail, and a slider glass, the first glass variation being devoid of a slider rail and slider glass;
   wherein the glass flange selectively receives either the first glass variation or the second glass variation in the window opening, and wherein, when the second glass variation is mounted to the glass flange, the slider rail is positioned between the second mounting pad and the fixed glass of the second glass variation.

2. The rear window assembly of claim 1, wherein the glass flange includes a pocket, the first mounting pad positioned outside of the pocket, the second mounting pad being positioned inside of the pocket, the pocket being configured to receive the slider rail of the second glass variation.

3. The rear window assembly of claim 1, wherein the first mounting pad is generally planar and the second mounting pad is generally planar, the second mounting pad being parallel to and non-coplanar with the first mounting pad.

4. The rear window assembly of claim 1, wherein the glass flange includes a transition wall between the first mounting pad and the second mounting pad, the transition wall being oriented transverse to the first mounting pad and the second mounting pad.

5. The rear window assembly of claim 1, further comprising a seal either coupled to the first mounting pad when the first glass variation is mounted to the glass flange or coupled to the second mounting pad when the second glass variation is mounted to the glass flange.

6. The rear window assembly of claim 5, wherein the seal comprises a urethane member and a rubber dam.

7. The rear window assembly of claim 1, wherein the glass flange defines an upper glass flange configured to extend across a top of the window opening, the first mounting pad being positioned above the second mounting pad, the body mounting flange being positioned above the first mounting flange.

8. The rear window assembly of claim 1, wherein the glass flange defines a lower glass flange configured to extend across a bottom of the window opening, the first mounting pad being positioned below the second mounting pad, the body mounting flange being positioned below the first mounting pad.

9. The rear window assembly of claim 8, wherein, when the second glass variation is mounted to the glass flange, water is able to drain from the space between the glass flange and the second glass variation.

10. A rear window assembly for a vehicle comprising:
    a glass flange configured to be positioned in a window opening of a body of the vehicle, the glass flange having an outer end and an inner end opposite the outer end, the glass flange having an exterior surface facing an exterior of the vehicle and an interior surface facing an interior of the vehicle, the glass flange comprising a body mounting flange proximate to the outer end configured to be mounted to the body of the vehicle, the glass flange comprising a first mounting pad defined along the exterior surface proximate to the outer end, the glass flange comprising a second mounting pad defined along the exterior surface proximate to the inner end, the second mounting pad being recessed toward the interior of the vehicle relative to the first mounting pad;
    a non-slider window comprising a fixed glass having an edge, a seal directly applied to the fixed glass of the non-slider window proximate to the edge;
    a slider window comprising a fixed glass having an edge, a slider rail applied directly to the fixed glass of the slider window proximate to the edge, a slider window received in the slider rail and movable relative to the fixed glass of the slider window, and a seal directly applied to the slider rail;

wherein the glass flange selectively receives the non-slider window or the slider window, wherein, when the non-slider window is mounted to the glass flange, the seal of the non-slider window is affixed to the first mounting pad, and wherein, when the slider window is mounted to the glass flange, the seal of the slider window is affixed to the second mounting pad with the slider rail positioned between the second mounting pad and the fixed glass of the slider window.

11. The rear window assembly of claim 10, wherein the glass flange includes a pocket, the first mounting pad positioned outside of the pocket, the second mounting pad being positioned inside of the pocket, the pocket being configured to receive the slider rail of the slider window.

12. The rear window assembly of claim 10 wherein the first mounting pad is generally planar and the second mounting pad is generally planar, the second mounting pad being parallel to and non-coplanar with the first mounting pad.

13. The rear window assembly of claim 10, wherein the glass flange includes a transition wall between the first mounting pad and the second mounting pad, the transition wall being oriented transverse to the first mounting pad and the second mounting pad.

14. The rear window assembly of claim 10, wherein the seal comprises a urethane member and a rubber dam.

15. The rear window assembly of claim 10, wherein the glass flange defines an upper glass flange configured to extend across a top of the window opening, the first mounting pad being positioned above the second mounting pad, the body mounting flange being positioned above the first mounting flange.

16. The rear window assembly of claim 10, wherein the glass flange defines a lower glass flange configured to extend across a bottom of the window opening, the first mounting pad being positioned below the second mounting pad, the body mounting flange being positioned below the first mounting pad.

17. The rear window assembly of claim 16, wherein, when the second glass variation is mounted to the glass flange, water is able to drain from the space between the glass flange and the second glass variation.

18. A method of assembling a vehicle, said method comprising:

providing a body with a window opening;

attaching a glass flange to the body around the window opening, the glass flange having an outer end, an inner end opposite the outer end, and an exterior surface facing an exterior of the vehicle, the glass flange including a first mounting pad defined along the exterior surface near the outer end of the glass flange, and a second mounting pad defined along the exterior surface near the inner end of the glass flange and offset from the first mounting pad and recessed toward an interior of the vehicle relative to the first mounting pad to define a pocket rearward of the second mounting pad; and selectively attaching either a non-slider window to the first mounting pad or a slider window to the second mounting pad, wherein the slider window includes a fixed glass, a slider rail, and a slider glass, where the slider rail of the slider window is received in the pocket rearward of the second mounting pad and between the second mounting pad and the fixed glass of the slider window when the slider window is mounted to the glass flange.

19. The method of claim 18, wherein no portion of the slider window is received in the pocket when the non-slider window is mounted to the glass flange.

20. The method of claim 18, wherein said selectively attaching comprises:

attaching a seal to a fixed glass of the non-slider window and attaching the seal to the first mounting pad when the non-slider window is mounted to the glass flange; and attaching a seal to the slider rail of the slider window and attaching the seal to the second mounting pad when the slider is mounted to the glass flange.

* * * * *